(12) United States Patent
Herzog et al.

(10) Patent No.: US 11,884,006 B2
(45) Date of Patent: Jan. 30, 2024

(54) APPARATUS FOR THE ADDITIVE MANUFACTURING OF A THREE-DIMENSIONAL OBJECT

(71) Applicant: Concept Laser GmbH, Lichtenfels (DE)

(72) Inventors: Frank Herzog, Lichtenfels (DE); Florian Bechmann, Lichtenfels (DE); Fabian Zeulner, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 0 days.

(21) Appl. No.: 17/366,642

(22) Filed: Jul. 2, 2021

(65) Prior Publication Data

US 2021/0331392 A1    Oct. 28, 2021

Related U.S. Application Data

(63) Continuation of application No. 16/078,622, filed as application No. PCT/EP2017/054496 on Feb. 27, 2017, now Pat. No. 11,052,605.

(30) Foreign Application Priority Data

Mar. 8, 2016    (DE) .......................... 102016104180.7

(51) Int. Cl.
*B29C 64/153*    (2017.01)
*B33Y 10/00*    (2015.01)
(Continued)

(52) U.S. Cl.
CPC ............ *B29C 64/153* (2017.08); *B22F 10/28* (2021.01); *B22F 12/22* (2021.01); *B22F 12/41* (2021.01);
(Continued)

(58) Field of Classification Search
CPC ... B29C 64/264; B29C 64/268; B29C 64/277; B29C 64/282; B29C 64/227;
(Continued)

(56) References Cited

U.S. PATENT DOCUMENTS 6,054,077 A    4/2000    Comb
6,751,516 B1   6/2004    Richardson
(Continued)

FOREIGN PATENT DOCUMENTS

CN    104742376 A    7/2015
CN    103990798 B    10/2015
(Continued)

*Primary Examiner* — Seyed Masoud Malekzadeh
(74) *Attorney, Agent, or Firm* — Dority & Manning, P.A.

(57) ABSTRACT

An irradiation assembly for additively manufacturing three-dimensional objects may include an irradiation device and a magnetic mounting device configured to displaceably support the irradiation device. The irradiation device may include one or more illumination elements respectively configured to emit an energy beam. The magnetic mounting device may include a magnetic slider element coupled to the irradiation device and a magnetic stator element couplable to a housing structure of an additive manufacturing machine. The magnetic stator element may include a displacement track configured to guide the magnetic slider element along a movement path above at least a portion of a construction plane of the additive manufacturing machine while the one or more illumination elements respectively emit the energy beam to selectively irradiate build material at specified regions of the construction plane.

19 Claims, 5 Drawing Sheets

(51) Int. Cl.
  *B33Y 30/00* (2015.01)
  *B29C 64/264* (2017.01)
  *B22F 12/45* (2021.01)
  *B22F 12/00* (2021.01)
  *B22F 12/41* (2021.01)
  *B29C 64/227* (2017.01)
  *B29C 64/268* (2017.01)
  *B29C 64/282* (2017.01)
  *B22F 12/47* (2021.01)
  *B22F 12/48* (2021.01)
  *B22F 12/46* (2021.01)
  *B29C 64/277* (2017.01)
  *B22F 12/49* (2021.01)
  *B22F 10/28* (2021.01)
  *B28B 1/00* (2006.01)
  *B22F 10/32* (2021.01)

(52) U.S. Cl.
  CPC .............. *B22F 12/45* (2021.01); *B28B 1/001* (2013.01); *B29C 64/227* (2017.08); *B29C 64/264* (2017.08); *B29C 64/268* (2017.08); *B33Y 10/00* (2014.12); *B33Y 30/00* (2014.12); *B22F 10/32* (2021.01); *B22F 12/46* (2021.01); *B22F 12/47* (2021.01); *B22F 12/48* (2021.01); *B22F 12/49* (2021.01); *B22F 2999/00* (2013.01); *B29C 64/277* (2017.08); *B29C 64/282* (2017.08); *Y02P 10/25* (2015.11)

(58) Field of Classification Search
  CPC ... B29C 64/232; B29C 64/236; B29C 64/153; B22F 12/40; B22F 12/41; B22F 12/42; B22F 12/43; B22F 12/44; B22F 12/45; B22F 12/46; B22F 12/47; B22F 12/49; B22F 12/22; B22F 12/222; B22F 12/224
  See application file for complete search history.

(56) References Cited

U.S. PATENT DOCUMENTS

| | | |
|---|---|---|
| 9,475,234 B2 | 10/2016 | Morikawa |
| 9,862,055 B2 | 1/2018 | Goya et al. |
| 9,981,312 B2 | 5/2018 | Mackie et al. |
| 10,399,145 B2 | 9/2019 | McMurtry et al. |
| 10,479,018 B2 | 11/2019 | Brown et al. |
| 10,562,132 B2 | 2/2020 | Zediker |
| 10,786,947 B2 | 9/2020 | Grach et al. |
| 2013/0001834 A1* | 1/2013 | El-Siblani ............. B29C 64/124 264/401 |
| 2013/0052291 A1 | 2/2013 | Morikawa |
| 2014/0052288 A1* | 2/2014 | El-Siblani ............. B29C 64/264 700/119 |
| 2014/0263209 A1* | 9/2014 | Burris .................... B22F 12/43 219/121.75 |
| 2015/0183168 A1* | 7/2015 | Liverman ............. B29C 64/135 425/166 |
| 2015/0246486 A1 | 9/2015 | El-Siblani et al. |
| 2015/0323318 A1 | 11/2015 | Hess et al. |
| 2016/0008920 A1 | 1/2016 | Goya et al. |
| 2016/0067820 A1 | 3/2016 | Mironets et al. |
| 2016/0136730 A1 | 5/2016 | McMutry et al. |
| 2016/0332228 A1 | 11/2016 | Mackie et al. |
| 2017/0173736 A1* | 6/2017 | Gray ..................... B33Y 30/00 |
| 2017/0304946 A1 | 10/2017 | Shibazaki |
| 2017/0304947 A1 | 10/2017 | Shibazaki |
| 2018/0141270 A1 | 5/2018 | Steege |
| 2018/0333919 A1* | 11/2018 | Herzog .................. B28B 1/001 |

FOREIGN PATENT DOCUMENTS

| | | |
|---|---|---|
| CN | 103909268 B | 2/2018 |
| DE | 19541085 A1 | 5/1997 |
| DE | 102013011676 A1 | 1/2015 |
| EP | 2942130 A1 | 11/2015 |
| JP | 2013049137 A | 3/2013 |
| JP | 2014518171 A | 7/2014 |
| JP | 2014/161904 A | 9/2014 |
| JP | 2015157405 A | 9/2015 |
| JP | 2016/522761 A | 8/2016 |
| JP | 2016/528374 A | 9/2016 |
| WO | WO2013003457 A1 | 1/2013 |
| WO | WO2014/176536 A1 | 10/2014 |

* cited by examiner

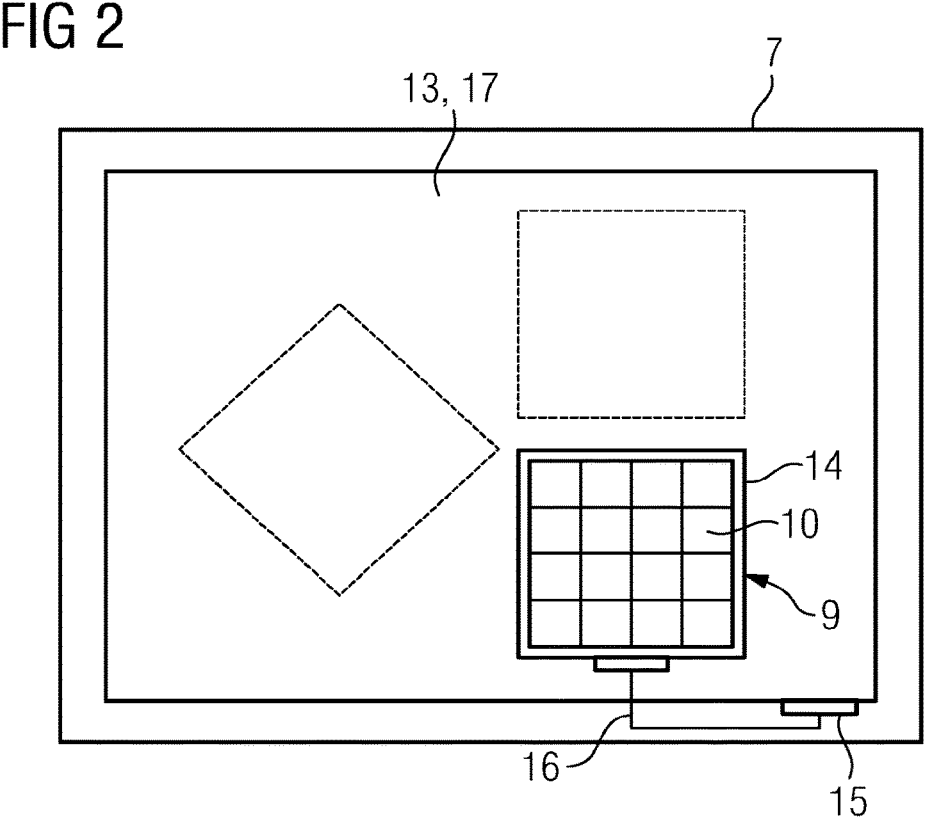
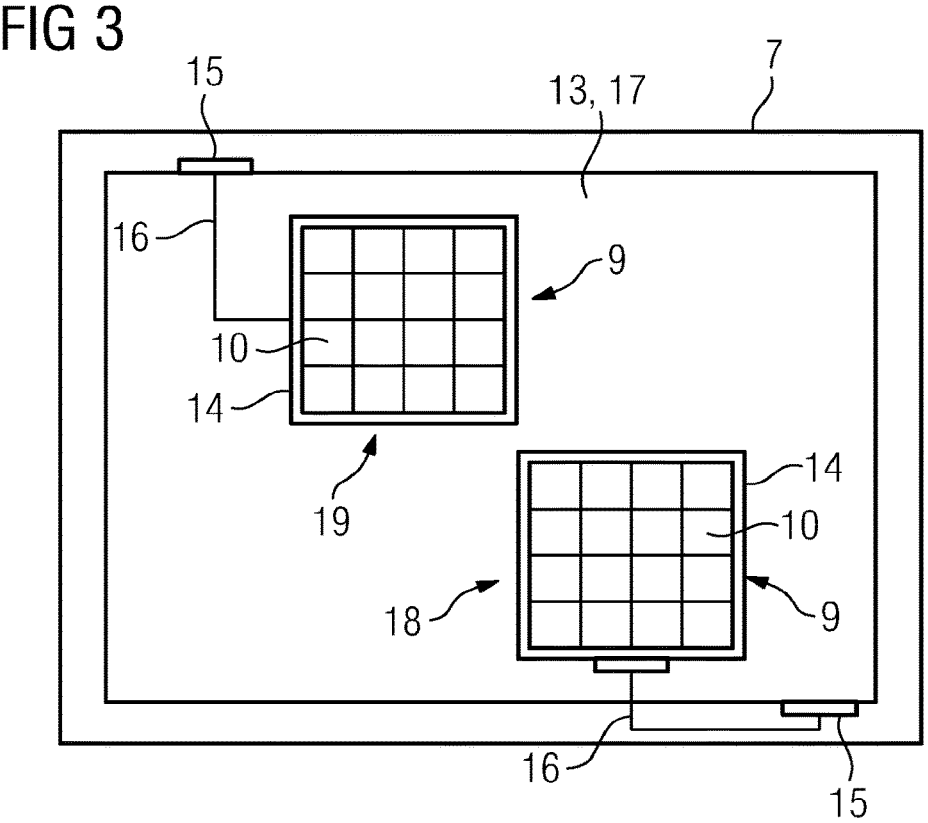

APPARATUS FOR THE ADDITIVE MANUFACTURING OF A THREE-DIMENSIONAL OBJECT

CROSS-REFERENCE TO RELATED APPLICATIONS

This application is a continuation of U.S. application Ser. No. 16/078,622, filed Aug. 21, 2018, which is scheduled to issue as U.S. Pat. No. 11,052,605 on Jul. 6, 2021, which is a United States national entry of International Application No. PCT/EP2017/054496, filed Feb. 27, 2017, which claims priority to German Patent Application No. 10 2016 104 180.7, filed Mar. 8, 2016, the contents of which are incorporated herein by reference in their entirety as if set forth verbatim.

BRIEF DESCRIPTION OF THE DRAWINGS

Exemplary embodiments of the present disclosure are described with reference to the Figures, in which:

FIG. 2 shows a cut-out view along the intersection II-II in the device shown in FIG. 1;

FIG. 3 shows a schematic diagram of a device according to a further exemplary embodiment in a view analog to that in FIG. 2;

DETAILED DESCRIPTION

Figure 1:
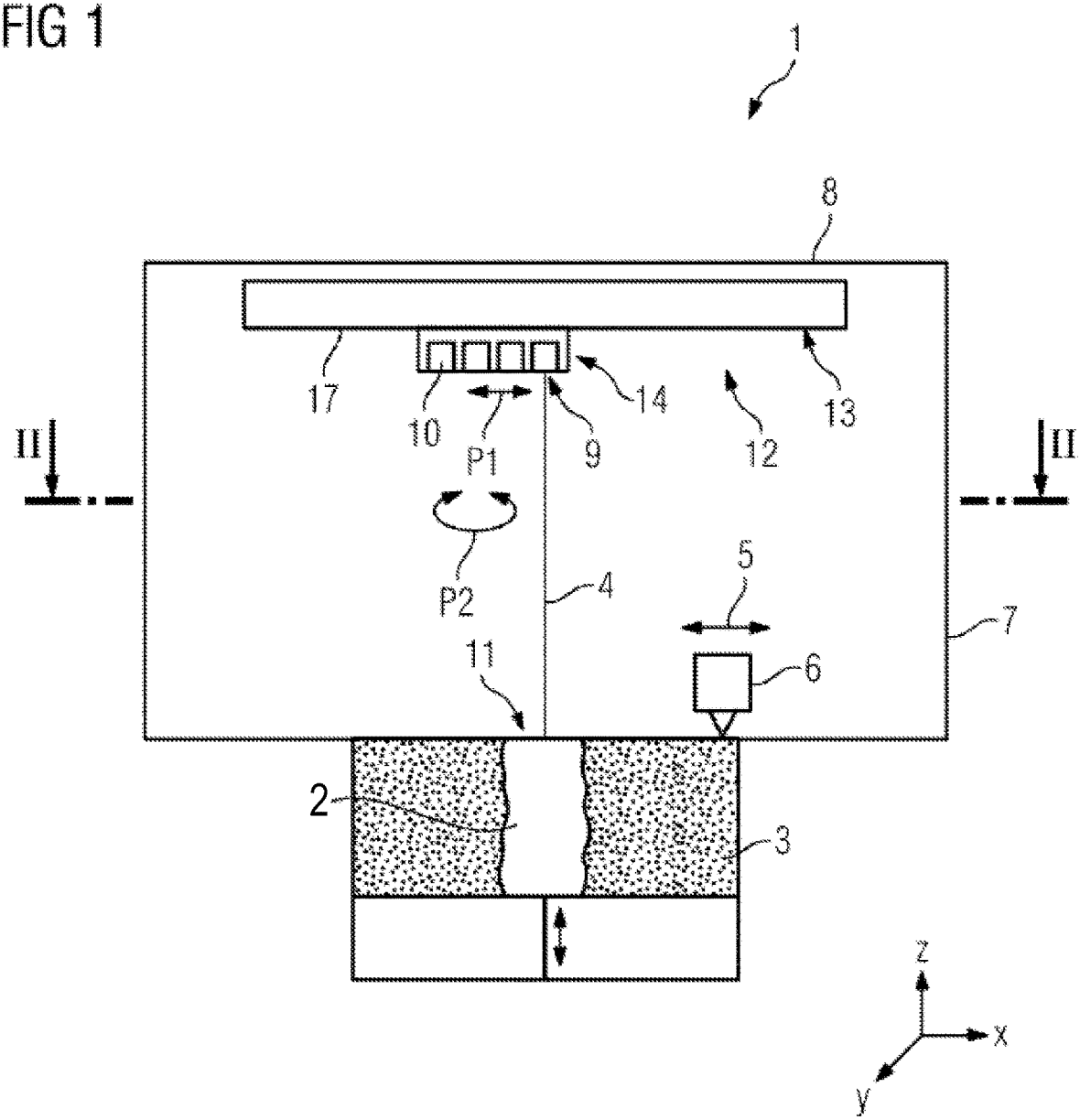
FIG. 1 shows a schematic diagram of a device according to an exemplary embodiment.

The invention concerns a device for the additive manufacture of a three-dimensional object by successive, layered, selective illumination and associated solidification of built material layers formed in a construction plane of a built material that can be solidified by means of at least one energy beam, comprising an illumination device which comprises at least one illumination element to generate an energy beam directed to the construction plane for the selective illumination of a built material layer that is to be selectively solidified.

Such devices for additive or generative manufacture of three-dimensional objects are known. By means of corresponding devices, three-dimensional objects are additively or generatively built up through successive, layered, selective illumination and thereby associated solidification of built material layers of solidifiable built material applied in a construction plane in respective transverse areas of the object to be manufactured by means of an energy beam. The successive, layered, selective illumination and thus solidification of built material layers to be solidified is accomplished based on the geometrical form—that is, particularly, the construction data describing the transverse geometry of the layers of the respective three-dimensional object.

An illumination device is available for the selective illumination of built material layers which are to be selectively solidified. The illumination device comprises one or more illumination elements, which are configured for the production of an energy beam on the construction level.

Displaceable mounting of corresponding illumination elements is particularly advantageous with comparatively large construction planes or volumes. The conventional technical solutions are, however, in need of further development as regards, for example, flexibility, precision, and ease of moving the illumination elements.

The object of the invention concerns an improved device for the additive manufacture of three-dimensional objects especially in regard to flexibility, precision, and smoothness of operation of the illumination elements.

The object is fulfilled by a device according to Claim 1. The dependent claims concern particular forms of embodiment of the device. The object is further fulfilled by a procedure in accordance with Claim 12.

The device described herein generally serves the purpose of the additive or generative manufacture of at least one three-dimensional object—that is for example, a technical component or a technical component group through successive, layered, selective illumination and associated solidification of individual built material layers from a solidifiable built material by means of at least one energy beam produced by at least one appurtenant illumination element. The energy beam can be a laser beam and the device can correspondingly be one for carrying out a selective laser melt process (SLM process) or selective laser sintering process (SLS process).

The built material suitable for solidification by means of corresponding energy radiation can be a metallic, plastic, and/or ceramic material in particle or powder form. A powdered mixture of different metals, plastics, or ceramics can be understood as metal, plastic, or ceramic powder. A metal powder is understood as being a powder of at least one metal alloy.

The successive, layered, selective illumination and the associated successive, layered, selective solidification of the built material layers to be solidified for manufacture of a three-dimensional object (in the following designated as "object") are accomplished on the basis of construction data of the object. Corresponding construction data generally describe the geometrical or geometrical constructive form of the object. Corresponding construction data can, for example, be CAD data of the object being manufactured or contain such data.

The device comprises all of the functional components necessary for carrying out additive construction processes. Since the functional or constructive structure of corresponding devices is known, only the essential functional components of the device relevant to the explanation of the principle described herein will be explained in the following.

The first essential functional component of the device for the principle described here is an illumination device. The illumination device comprises at least one illumination element, which is configured for the production of an energy beam directed to the construction level for selective illumination to selectively solidify the built material layer. It is explained below that it concerns, for example, an illumination element, among others, for example, a laser diode element or can comprise an illumination element, at least a laser diode element.

A further functional component of the device that is essential for explanation of the principle described here is a magnetic motion and mounting device ("magnetic mounting device" in the following), which is configured for displaceable mounting of at least one illumination element (configured inside a construction or processing chamber on the side of the device) in at least one degree of freedom relative to the construction level. The displaceable mounting realized by means of the magnetic mounting device is based—as seen below in more detail—on a magnetic interaction between different magnetic components of the mounting device attached to different functional components of the device and allows a particularly precise, fast, and smooth-running, i.e. wear-resistant, movement of individual, several, or all illumination elements in at least one degree of freedom relative to the construction level. Movements of an illumination element can comprise translatory degrees of freedom along at least one translation axis and/or rotational degree of freedom around at least one rotation axis. It can be, for example, linear movement along a linear displacement axis (translation axis) and/or a rotary motion around a rotary axis (rotation axis) in movement of an illumination element relative to the construction level and/or relative to at least one further illumination element. Individual, several, or all illumination elements can, of course, be combined to be displaceable in different degrees of freedom.

The magnetic mounting device allows for a precise, fast, and flexible alignment and arrangement of respective illumination elements relative to the construction level, which can be particularly advantageous in the case of comparatively complex geometries of the manufactured object and comparatively large construction levels or construction volumes in order to maintain the highest possible component quality, the highest possible construction rate, and the highest possible consistent load factor of the respective illumination elements.

For the instance in which the illumination device comprises a number of illumination elements, with a certain number of illumination elements being consolidated structurally in at least one illumination element group, different illumination element groups can be displaceable—dependently or independently of each other—in relation to an object being manufactured. A respective illumination element group can comprise a given number of illumination elements in a given orientation relative to each other, for example in rows and/or columns.

Overall, the device described here is an improved device, because it is especially flexible, precise, fast, and smooth-running due to the low-wear movement of the respective illumination elements. It is thus an improved device.

The magnetic mounting device typically comprises at least one magnetic stator element installed or formed on the housing side of the device, especially at least in part above the construction level and the stator element configured and associated with it, and at least one magnetic slider element installed and configured to be displaceably coupled with at least one illumination element. The magnetic slider element is displaceably mounted by means of magnetic interaction with the magnetic stator element. The displaceable mounting of a respective illumination element is thus realized by means of magnetic interaction between the magnetic stator element and a slider element connected displaceably with the illumination element. Both the magnetic stator element and the magnetic slider element typically comprise as an active magnetic constituent at least an electromagnetic component, to which the electrical supply for the magnetic stator element and/or the magnetic slider element is connected. In this connection, an electrical connection is possible between the magnetic stator element and the magnetic slider element. The electrical connection between a magnetic stator element and a magnetic slider element can be realized, for example, by means of an electrical connector, in particular an electrical connection cable between a magnetic stator element and a magnetic slider element.

Respective magnetic stator or slider elements are typical constituents of planar drives. The magnetic mounting device can thus be comprised as a planar drive or at least include one.

In view of the configuration of the magnetic mounting device as a planar drive, the magnetic mounting device can comprise the required appropriate functional components for realization of a corresponding planar drive—that is, for example, a slide bearing device enabling a magnetic slide element to slide along the magnetic stator element and/or a (pneumatic) mounting device enabling a (pneumatic) floating mounting of a magnetic slider element along the magnetic stator elements mounting device.

At least one magnetic stator element typically comprises at least one planar stator element section defining a displacement track or level for a magnetic slider element. The concept "planar" means both even and uneven, for example curved or arcuate, surfaces. A planar stator element section can, accordingly, be configured to be planar—at least in sections, but particularly in its entirety—or to be curved or arcuate, at least in sections, but particularly in its entirety, especially as a dome shape.

A planar stator element section can also be configured parallel and/or relative to the construction level. A parallel configuration of a planar stator element section relative to the construction level enables a movement of respective magnetic slide elements or illumination elements connected to move with it and thus at a right angle, i.e. with an illumination angle of approx. 900 relative to the construction level for illumination of the construction level. An angled, for example inclined, configuration of a planar stator element section enables movement of respective magnetic slider elements or illumination elements connected for displacement in an angle (clearly) under 90° relative to the construction level and thus an angled, i.e. under an illumination angle <90°, in particular between 1 and 89°, preferably between 10 and 80° relative to the construction level, for illumination of the construction level.

It holds generally that different displacement tracks or levels of respective magnetic slider elements and thus a maximum of flexibility with regard to possible displacement of respective illumination elements and illumination situations resulting therefrom can be realized by geometric embodiment—that is, especially, form and dimensions of respective planar stator element sections and/or the orientation of respective planar stator element sections relative to the construction level.

Typically at least one planar stator element section is configured parallel to the construction level and above the construction level. The planar extension of a planar stator element section configured parallel to the construction level above the construction level is selected so that the planar stator element section covers the construction level at least in sections, and where appropriate completely. There is, of course, a sufficiently large distance between the stator element section and the construction level so that the magnetic interaction between the magnetic stator element and the magnetic slider element has no (magnetic) influence on the quality of a (magnetic or magnetizable) built material layer formed in the construction level. Separate magnetic shielding elements can be provided where appropriate, for example, by a suitable shield structure or a suitable shielding material, for example a shielding plate. At least one shielding element that is locatable or installed between the construction level and the magnetic mounting device for magnetic shielding of the construction level from the magnetic mounting device can thus be associated with the device.

Planar stator element sections that are angled relative to the construction level can extend at least in sections, and where appropriate completely, along the outer dimensions of the construction level and enclose the outside dimensions of the construction level in sections or, where appropriate, completely. Of course, several angled planar stator element sections at an angle relative to the construction level, which surround the outer dimensions of the construction level completely or at least in sections, can be present at least in sections or, where appropriate, completely. An at least sectional "framing" of the construction level with corresponding planar stator element sections can be obtained through an angled configuration of respective planar stator element sections. (Simultaneous) illumination of the construction level is possible from different directions and/or with different angles of illumination by means of magnetic slider elements located on respective planar stator element sections or respective displaceably mounted illumination elements.

In order further to increase the flexibility of possible movements of respective illumination elements and the resulting illumination situation—independently of the configuration and orientation of respective planar stator element sections relative to the construction level—planar stator element sections in at least one degree of freedom can also be configured relative to the construction level. The planar stator element sections are secured on a displaceably configured retention device with at least one degree of freedom relative to the construction level. Movements of a corresponding retention device can comprise translatory degrees of freedom along at least one translation axis and/or rotational degree of freedom around at least one rotation axis. It can be a matter of linear movement along a linear movement axis (translation axis) and/or a rotary motion around a rotary axis (rotation axis) in displacement of a corresponding retention device relative to the construction level. The retention device can, of course, be combined to be displaceable in different degrees of freedom.

Individual, several, or all planar stator element portions can be formed in a modular manner, with the modular formed planar stator element sections being removably attached or attached to the device side on a housing structure of the device in at least one predetermined arrangement position relative to the construction plane. The housing structure can, for example, be configured with differently oriented recording devices for respective recording of at least one planar stator element section, for example, with respect to the geometrical design. i.e. in particular the dimensions and form of the recording devices that can be inserted for recording at least one planar stator element section. In this way it is possible to configure the device individually with regard to certain "construction jobs," i.e. the additive manufacture of certain objects in order to achieve the highest quality of component and/or construction rate.

An illumination element can be formed as a laser diode element or a lens-shaped, optical element that can be coupled with or is coupled with a laser diode element, or as a scanner element as part of an optical scanner device, or comprise at least one of the elements mentioned. An advantage of laser diode elements is their light weight, so that for displacement of the illumination elements there is comparatively little weight to move.

Respective laser diode and scanner elements can be installed inside a construction or processing chamber limited by a housing structure on the side of the device in which additive construction procedures are carried out. On or more laser diode elements can, however, also be installed outside a corresponding construction or processing chamber. In this case optical elements can be coupled or are coupled inside the construction or processing chamber with at least one laser diode element, for example in the form of optical lens elements for focusing an energy beam on the construction level.

The invention further concerns a method for the additive manufacture of at least one three-dimensional object by successive, layered, selective solidification of individual built material layers from solidifiable built material by means of an energy beam. The process can be one for carrying out a selective laser melt process (SLM process) or selective laser sintering process (SLS process). The procedure is characterized in that a device as described is used for the additive manufacture of a three-dimensional object. Accordingly, all above-mentioned embodiments in connection with the device are analogously valid for the procedure.

The invention is explained in more detail in the exemplary embodiments in the drawings. The following are shown:

FIGS. 1-6 show a schematic diagram of a device for the additive manufacture of a three-dimensional object according to an exemplary embodiment.

FIG. 1 shows a schematic diagram of a device 1 according to an exemplary embodiment. Device 1 serves the purpose of the additive manufacture of three-dimensional objects 2, i.e. in particular of a technical component or technical component group, by means of successive, layered, selective illumination and associated successive, layered, selective illumination and therewith associated solidification of built material layers from a solidifiable built material 3 by means of an energy or laser beam 4.

The solidifiable built material 3 can be a metal powder (mixture), i.e. for example, an aluminum powder (mixture) or a steel powder (mixture), and/or a plastic powder (mixture), i.e. a polyether ether ketone powder (mixture), and/or a ceramic powder (mixture), i.e. an aluminum oxide powder (mixture).

Respective built material layers to be solidified are formed by means of a displaceably mounted coating device 6 in the processing chamber 8 of device 1, as indicated by the horizontal double arrow 5 in a processing chamber 8 of device 1 installed through a housing structure 7. An inert gas atmosphere typically prevails in the construction chamber 8, i.e. for example an argon or nitrogen atmosphere. The successive, layered, selective solidification of respective built material to be solidified is carried out in that one or more energy beams 4 are selectively directed on cross section geometry of layers to be solidified of the object 2 corresponding to areas of respective built material layers ("selective illumination").

Respective energy beams 4 are produced by an illumination elements 10 of an illumination device 9. A respective illumination element 10 is configured for production of an energy beam 4 directed to the construction level 11 for selective illumination for selectively solidifying the built material layer. The illumination elements 10 can be installed in a row and/or columnar ("matrix-like) configuration.

An illumination element 10 can be a variable ("dimmable") laser diode element, where appropriate in at least one of the parameters concerning the beam characteristics, i.e. its input power or output power. Laser beams with varying beam characteristics, for example various energy density, intensity, etc. can be produced by variation of the input or output power, laser beams with varying beam characteristics, etc. The laser performance emitted by corresponding laser diode elements are typically in a range between 0.1 and 10 watts.

Device 1 comprises a magnetic motion and mounting device 2 ("magnetic mounting device" in the following), which is configured for displaceable mounting of the illumination device 9 or of the respective illumination element 10 relative to construction level 11. The displaceable mounting realized by means of the magnetic mounting device 12 is based on magnetic interaction between different magnetic components of the magnetic mounting device 12 associated with different functional components of the device 1 and allows a particularly precise, fast, and smooth running, i.e. wear-resistant, movement of the illumination elements 10 in at least one degree of freedom relative to the construction level 11. Movements of an illumination element 10—as indicated by the double arrow P1—can comprise translatory degrees of freedom along at least one translation axis and/or—as indicated by the double arrow P2—rotational degree of freedom around at least one rotation axis. A movement of an illumination element 10 can, for example, be linear movement along a linear movement axis (translation axis) and/or a rotary motion around a rotary axis (rotation axis). Exemplary translation and displacement axes are depicted as axes of the coordinate system shown in FIG. 1. The illumination elements 10 can, of course, be combined to be displaceable in different degrees of freedom.

The magnetic mounting device 12 typically comprises a magnetic stator element 13 installed or formed on the device side of the housing structure 7 above the construction level 11 and a magnetic slider element 14 with the illumination elements 10 installed or formed, i.e. coupled for displacement with the illumination element 10. The magnetic stator element 13 and the magnetic slider elements 14 represent magnetically interacting constituents of a planar drive. The magnetic mounting device 12 is configured consequently as a planar drive.

The magnetic stator element 13 is coordinated with the housing structure 7, the magnetic slider element 14 with the illumination device 9 or the illumination elements 10. The magnetic slider element 14 is displaceably mounted relative to the magnetic stator element 13 by means of magnetic interaction. The displaceable mounting of the illumination elements 10 is thus realized by means of magnetic interaction between the magnetic stator element 13 and a magnetic slider element 14 connected displaceably with the illumination elements 10. Both the magnetic stator element 13 and the magnetic slider element 14 typically comprise as an active magnetic constituent, typically at least an electromagnetic component (not shown in detail) to which the electrical supply 15 for the magnetic stator element 13 or the magnetic slider element 14 is connected. FIG. 2).

Even though not explicitly depicted in the FIG., the magnetic mounting device 12 comprises the required or appropriate functional components for realization of a planar drive, i.e. for example a slide mounting device enabling slide mounting of a magnetic slide element 14 along the magnetic stator element 13 and/or a (pneumatic) floating mounting of a magnetic slider element 14 along the mounting device of magnetic stator element 13 enabling a (pneumatic) mounting device.

FIG. 2 shows a cut-out view along the intersection II-II through device 1 with the line of vision in the direction of the cover of housing structure 7.

On the basis of FIG. 1, in FIG. 2 it is above all clear that the magnetic stator element 13 comprises a planar stator element section 17. The planar stator element section 17 defines the displacement level on which the magnetic slider element 14 is displaceable. The planar stator element section 17 is configured to be flush (flat) and parallel to the construction level 11. The planar extension of the planar stator element section 17 is chosen so that the planar stator element section 17 covers the construction level 11 at least in sections, and where appropriate completely. The parallel configuration of the planar stator element section 17 relative to the construction level 11 enables a movement of the magnetic slide element 14 or therewith displaceably coupled illumination elements 10 parallel to construction level 11 and thus a right angle, i.e. with an illumination angle of approx. 90° relative to the construction level 11, illumination of the construction level 11.

Furthermore, in FIG. 2 some exemplary displacement positions of the magnetic slider element 14 inside the displacement level defined by the dimensions of the planar stator element section 17 are indicated. As mentioned, the magnetic slider element 14 is displaceable in any translatory and/or rotary degree of freedom.

Furthermore, in FIG. 2 a conceivable possibility can be seen for configuration of a designated electricity supply 15 for electric supply to the electromagnetic constituents on the stator element side or the slider element side. The electrical energy supply 15, for which a conventional electrical source, i.e. for example a grid connection with appurtenant control electronics, is installed here on the stator element side. The electrical supply of the magnetic slider element 14 is accomplished by means of an electrical connection element 16 configured as an electric connection cable between the electrical energy supply 15 and the magnetic slider element 14. The electric connection element 16 is so structured that it enables the greatest possible freedom of movement of the magnetic slider element 14. The electrical connection element 16 thus consequently comprises, for example, correspondingly sufficient flexibility and length.

FIG. 3 shows a schematic diagram of a device 1 according to a further exemplary embodiment in a view analog to that in FIG. 2.

Furthermore, in FIG. 3 it can be seen that the magnetic mounting device 12 can comprise several displaceable magnetic slider elements 14 that are dependent or independent of each other. This is especially for the case in which the illumination device 9 comprises a number of illumination elements 10, where a given number of illumination elements 10 configured in a given alignment relative to each other, for example in rows and/or in columns, are consolidated structurally to a (first) illumination element group 18 and a given number in a given alignment relative to each other, for example illumination elements 10 in rows and/or in columns, structurally consolidated into a further illumination element group 19. As mentioned, respective magnetic slider elements 14 are displaced dependently or independently of each other. Accordingly, respective illumination element groups 18, 10 can be displaced dependently or independently of each other.

Figure 4:
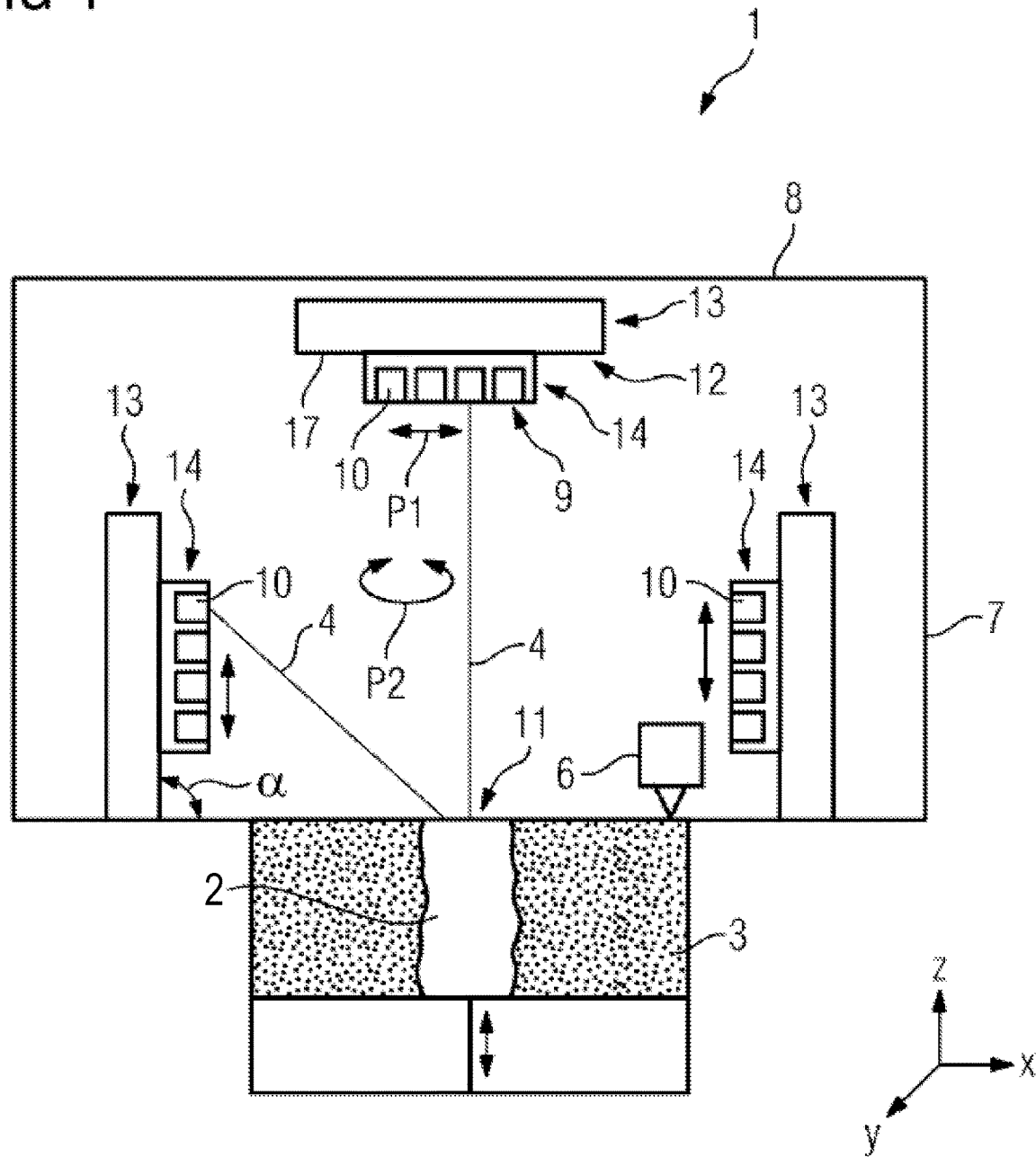
FIG. 4 shows a schematic diagram of a device according to a further exemplary embodiment.

FIG. 4 shows a schematic diagram of a device 1 according to a further exemplary embodiment.

The magnetic mounting device 12 comprises several magnetic stator elements 13 here with these respectively associated magnetic slider elements 14 as a general difference to the exemplary embodiments shown in the previous FIG. Angled, i.e. vertically oriented, magnetic stator elements 13 or planar stator elements sections 17 are present as a particular difference to the exemplary embodiments shown in the previous FIG. It is, of course, possible to provide only a magnetic stator element section 13 that is oriented at an angle to construction level 11. Planar stator element sections 17 configured at an angle to construction level 11 can where appropriate extend completely along the outer dimensions of the construction level 11 and consequently where appropriate enclose the construction level 11 completely. Several angled planar stator element sections 17 can, of course, be present relative to the planar stator element sections 17 relative to the construction level 11.

The angled configuration of respective planar stator element sections 17 enables (simultaneous) movement of respective magnetic slider elements 14 or displaceable illumination elements 10 connected for displacement in different angles α (clearly) under 90° relative to the construction level 11 and thus (simultaneous) angled illumination of construction level 11, i.e. under an illumination angle α<90°, in particular between 1 and 89°, preferably between 10 and 80° relative to the construction level 11. Exemplary displacements of the magnetic slider elements 14 are indicated by (horizontal and vertical) double arrows.

Figure 5:
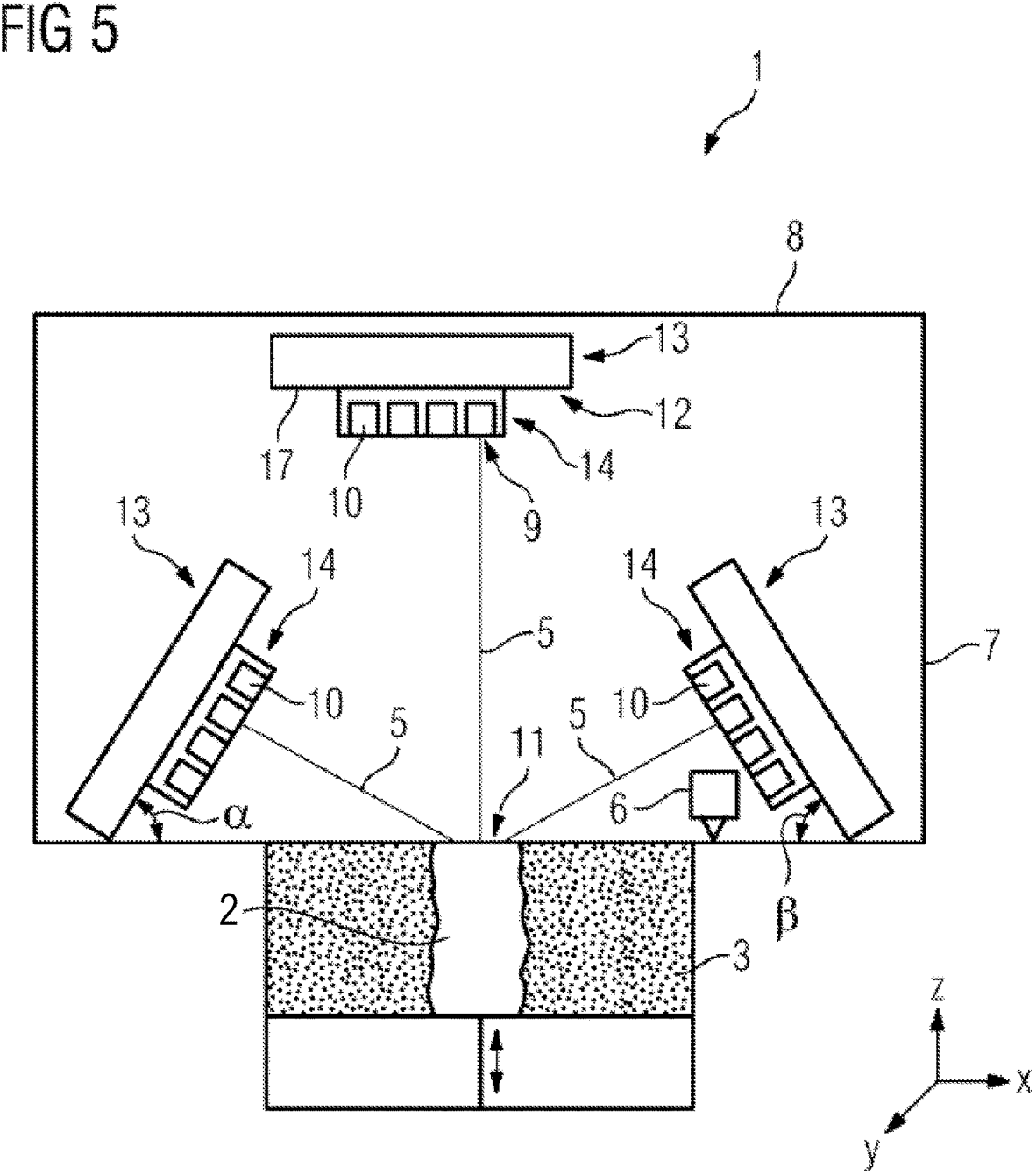
FIG. 5 shows a schematic diagram of a device according to a further exemplary embodiment.

FIG. 5 shows a schematic diagram of a device 1 according to a further exemplary embodiment.

In contrast to the exemplary embodiment shown in FIG. 4, magnetic stator elements 13 or planar stator elements sections 17 are oriented at an angle to the construction level 11. It is, of course, possible to provide only a magnetic stator element section 13 that is inclined at an angle to construction level 11. The angled, inclined configuration of respective planar stator element sections 17 relative to the construction level 11 also enables movement of respective magnetic slider elements 14 or displaceable illumination elements 10 at different angles α, β (clearly) under 90° relative to the construction level 11 and thus angled illumination of construction level 11, i.e. under an illumination angle <90°, in particular between 1 and 80°, preferably between 10 and 80° relative to the construction level 11. Exemplary displacement of the magnetic slider elements 14 are indicated again by double arrows.

Figure 6:
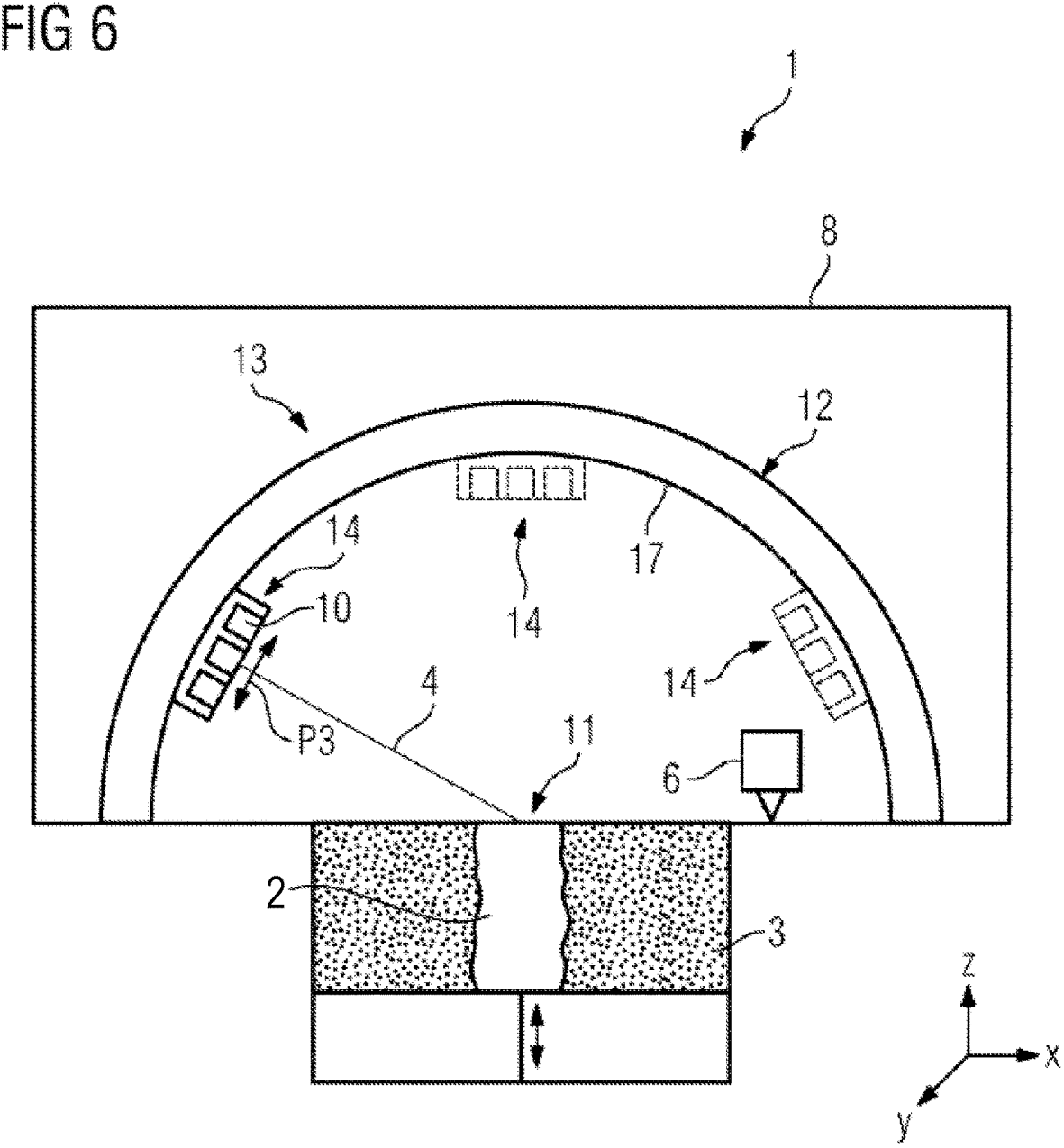
FIG. 6 shows a schematic diagram of a device 1 according to a further exemplary embodiment.

FIG. 6 shows a schematic diagram of a device 1 according to a further exemplary embodiment.

In distinction to the exemplary embodiments shown in the previous FIG., the planar stator element section 17 is not planar (flat) here but rather curved or vaulted, and consequently dome-shaped. Possible movements of a magnetic slider element 14 occur here—as indicated by the double arrow P3—particularly along a defined curved or arcuate displacement track or plane through the curve or curvature of the planar stator element section 17. Exemplary positions of the magnetic slider element 14 are shown as dashed.

It holds for all exemplary embodiments that between a respective planar stator element section 17 and the construction level 11 there is a sufficiently large distance, so that the magnetic interaction between a magnetic stator element 13 and a magnetic slider element 14 has no (magnetic) influence on the quality of a (magnetic or magnetizable) built material layer formed in the construction level 11. Where appropriate, separate magnetic shielding elements (not shown) can be provided, for example from a suitable shield structure or a suitable shielding material, for example a shielding plate, for magnetic shielding of the construction level 11 from the mounting device 12.

It further holds for all exemplary embodiments that also the planar stator element sections 17 can be configured at least with one degree of freedom relative to the construction level 11. The planar stator element sections 17 are secured on a displaceably mounted retention device (not shown) with at least one degree of freedom relative to the construction level 11. Movements of a corresponding retention device can comprise translatory degrees of freedom along at least one translation axis and/or rotational degree of freedom around at least one rotation axis.

It finally holds for all exemplary embodiments that individual, several, or all planar stator element sections 17 can be formed in a modular manner, with the modular formed planar stator element sections 17 being removably attached or attached to the device side on a housing structure 7 of the device in at least one predetermined arrangement position relative to the construction plane 11. The housing structure 7 can, for example, be configured with differently oriented, for example with respect to the geometric design, i.e. in particular the dimensions and form of the recording devices (not shown) that can be inserted for recording at least one planar stator element section 17. In this way it is possible to configure the device 1 individually with regard to certain "construction jobs," i.e. the additive manufacture of certain objects 2 in order to achieve the highest quality of component and/or construction rate.

With the devices 1 shown in the FIG., a method can be implemented for the generative manufacture of a three-dimensional object 2 by successive, layered, selective solidification of built material layers from solidifiable built material 3 by means of an energy beam 4. The process can be one for carrying out a selective laser melt process (SLM process) or selective laser sintering process (SLS process). Individual, several, or all features shown with reference to a given exemplary embodiment can be transferred to at least one other exemplary embodiment.

REFERENCE NUMBER LIST

1 Device
2 Object
3 Built material
4 Energy beam
5 Double arrow
6 Coating device
7 Housing structure
8 Processing chamber
9 Illumination device
10 Illumination element
11 Construction level
12 Magnetic mounting device
13 Magnetic stator element
14 Magnetic slider element
15 Electric energy supply
16 Electric connection element
17 Planar stator element section
18 Illumination element group
19 Illumination element group
P1 Double arrow
P2 Double arrow

The invention claimed is:

1. An irradiation assembly for additively manufacturing three-dimensional objects, the irradiation assembly comprising:
   an irradiation device comprising one or more illumination elements respectively configured to emit an energy beam; and
   a magnetic mounting device configured to displaceably support the irradiation device, the magnetic mounting device comprising a magnetic slider element coupled to the irradiation device and a magnetic stator element couplable to a housing structure of an additive manufacturing machine, at least one of the magnetic slider element and the magnetic stator element including an active magnetic component configured to hold the magnetic slider element to the magnetic stator element;

wherein the magnetic stator element comprises a displacement surface configured to magnetically slide the magnetic slider element along a movement path above at least a portion of a construction plane of the additive manufacturing machine while the one or more illumination elements respectively emit the energy beam to selectively irradiate build material at one or more regions of the construction plane, wherein the displacement surface is configured to magnetically slide the magnetic slider element in at least two perpendicular linear movement axes defined in the displacement surface.

2. The irradiation assembly of claim 1, wherein the one or more illumination elements comprises a plurality of illumination elements arranged in one or more rows and/or one or more columns.

3. The irradiation assembly of claim 2, wherein the plurality of illumination elements are respectively configured to emit the energy beam oriented perpendicular to the construction plane.

4. The irradiation assembly of claim 1, wherein the displacement surface is configured to magnetically slide the magnetic slider element about a rotary movement axis normal to the displacement surface.

5. The irradiation assembly of claim 1, comprising:
a plurality of irradiation devices coupled to the magnetic slider element.

6. The irradiation assembly of claim 1, comprising:
an additional irradiation device comprising an additional one or more illumination elements respectively configured to emit an additional energy beam;
wherein the magnetic mounting device comprises an additional magnetic slider element coupled to the additional irradiation device; and
wherein the displacement surface is configured to magnetically slide the additional magnetic slider element along the movement path above at least a portion of the construction plane of the additive manufacturing machine while the additional one or more illumination elements respectively emit the additional energy beam to selectively irradiate the build material at one or more regions of the construction plane,
wherein the magnetic slider element and the additional magnetic slider element are configured to move independent of one another.

7. The irradiation assembly of claim 1, comprising:
an additional irradiation device comprising an additional one or more illumination elements respectively configured to emit an additional energy beam;
an additional magnetic mounting device configured to displaceably support the additional irradiation device, the additional magnetic mounting device comprising an additional magnetic slider element coupled to the additional irradiation device and an additional magnetic stator element couplable to the housing structure of the additive manufacturing machine, the additional magnetic stator element oriented in an angular position relative to the construction plane; and
wherein the additional magnetic stator element comprises an additional displacement surface configured to magnetically slide the additional magnetic slider element along an additional movement path above at least a portion of the construction plane of the additive manufacturing machine while the additional one or more illumination elements respectively emit an additional energy beam to selectively irradiate the build material at specified regions of the construction plane.

8. The irradiation assembly of claim 7, wherein the magnetic slider element and the additional magnetic slider element are configured to move independent of one another.

9. The irradiation assembly of claim 1, comprising:
a plurality of irradiation devices respectively comprising a plurality of illumination elements, the plurality of illumination elements respectively configured to emit an energy beam, wherein the plurality of illumination elements corresponding to a respective one of the plurality of irradiation devices are arranged in one or more rows and/or one or more columns;
wherein the magnetic mounting device comprises a plurality of magnetic slider elements respectively coupled to a respective one of the plurality of irradiation devices, at least one of the plurality of magnetic slider elements movable independent of at least another of the plurality of magnetic slider elements;
wherein the displacement surface is configured to magnetically slide the plurality of magnetic slider elements along the movement path above at least a portion of the construction plane of the additive manufacturing machine while the plurality of illumination elements respectively emit an energy beam to selectively irradiate the build material at one or more regions of the construction plane.

10. The irradiation assembly of claim 1, comprising:
a plurality of irradiation devices respectively comprising a plurality of illumination elements, the plurality of illumination elements respectively configured to emit an energy beam, wherein the plurality of illumination elements corresponding to a respective one of the plurality of irradiation devices are arranged in one or more rows and/or one or more columns;
wherein the magnetic mounting device comprises a plurality of magnetic stator elements couplable to the housing structure of the additive manufacturing machine, and a plurality of magnetic slider elements respectively coupled to a respective one of the plurality of irradiation devices, at least one of the plurality of magnetic slider elements movable independent of at least another of the plurality of magnetic slider elements;
wherein respective ones of the plurality of magnetic stator elements comprises a corresponding displacement surface configured to magnetically slide a respective one of the plurality of magnetic slider elements along a corresponding one of a plurality of movement paths above at least a portion of the construction plane of the additive manufacturing machine while the corresponding plurality of illumination elements respectively emit an energy beam to selectively irradiate the build material at one or more regions of the construction plane.

11. The irradiation assembly of claim 1, wherein the displacement surface comprises a planar configuration.

12. The irradiation assembly of claim 11, wherein the movement path comprises a linear movement path.

13. The irradiation assembly of claim 1, wherein the displacement surface comprises a curved configuration.

14. The irradiation assembly of claim 13, wherein the movement path comprises a curved movement path.

15. The irradiation assembly of claim 13, wherein the irradiation device comprises a scanner element.

16. The irradiation assembly of claim 15, wherein the irradiation device comprises a plurality of illumination elements configured to emit a corresponding plurality of energy beams.

17. The irradiation assembly of claim 16, wherein the plurality of illumination elements are arranged in one or more rows and/or one or more columns.

18. The irradiation assembly of claim 17, wherein the scanner element is configured to direct the corresponding plurality of energy beam onto the construction plane at an illumination angle of from 10 degrees to 90 degrees relative to the construction plane.

19. An additive manufacturing machine, comprising:
a housing structure; and
the irradiation assembly of claim 1.

* * * * *